US008550906B2

(12) United States Patent
Suda et al.

(10) Patent No.: US 8,550,906 B2
(45) Date of Patent: Oct. 8, 2013

(54) GAME MACHINE AND GAME PROGRAM

(75) Inventors: Satoshi Suda, Chiyoda-Ku (JP); Katsumi Takahashi, Chiyoda-Ku (JP); Takaaki Inoue, Chiyoda-Ku (JP); Takayuki Suzuki, Chiyoda-Ku (JP)

(73) Assignee: Konami Gaming Incorporated, Las Vegas, NV (US)

( * ) Notice: Subject to any disclaimer, the term of this patent is extended or adjusted under 35 U.S.C. 154(b) by 1356 days.

(21) Appl. No.: 10/667,607

(22) Filed: Sep. 22, 2003

(65) Prior Publication Data

US 2004/0102236 A1 May 27, 2004

(30) Foreign Application Priority Data

Nov. 27, 2002 (JP) ................................ 2002-343921

(51) Int. Cl.
*A63F 13/00* (2006.01)
*A63F 9/24* (2006.01)

(52) U.S. Cl.
USPC ................................ 463/31; 463/16; 463/20

(58) Field of Classification Search
USPC ........................................ 463/16–20, 30, 31
See application file for complete search history.

(56) References Cited

U.S. PATENT DOCUMENTS

| | | | | |
|---|---|---|---|---|
| 5,205,555 | A * | 4/1993 | Hamano | 273/143 R |
| 5,449,173 | A | 9/1995 | Thomas et al. | |
| 5,766,074 | A | 6/1998 | Cannon et al. | |
| 5,807,172 | A | 9/1998 | Piechowiak | |
| 6,302,790 | B1 * | 10/2001 | Brossard | 463/20 |
| 6,311,976 | B1 * | 11/2001 | Yoseloff et al. | 463/20 |
| 6,419,579 | B1 * | 7/2002 | Bennett | 463/20 |
| 6,837,790 | B1 * | 1/2005 | Kaminkow | 463/31 |
| 6,942,572 | B2 * | 9/2005 | Inoue | 463/20 |

FOREIGN PATENT DOCUMENTS

| | | | |
|---|---|---|---|
| JP | 06-142277 | A | 5/1994 |
| JP | 06-190119 | A | 7/1994 |
| JP | 07-096075 | A | 4/1995 |
| JP | 07-100268 | A | 4/1995 |
| JP | 07-313660 | A | 12/1995 |
| JP | 2000-061073 | A | 2/2000 |
| JP | 2001-037996 | A | 2/2001 |
| JP | 2001-070543 | A | 3/2001 |
| JP | 2002-078860 | A | 3/2002 |

* cited by examiner

*Primary Examiner* — David L Lewis
*Assistant Examiner* — Robert Mosser
(74) *Attorney, Agent, or Firm* — Leason Ellis LLP.

(57) ABSTRACT

The game machine and game program of the present invention display, at the start of a game, multiple static symbols by constantly changing to various types of symbols including the wild symbol. The game machine then executes a static display by displaying such changing symbols statically again in each display area and recognizes the arrangements of each static symbol. Then, the game machine visually displays the arrangement of the symbols by which multiple wins are established or the win line related to such arrangements of the symbols, when the pre-determined combinations of symbols, in which at least one wild symbol is included, are arranged so that multiple wins are established. The game machine and game program according to the present invention increases the player's interest and arouses the player's anticipation.

32 Claims, 7 Drawing Sheets

GAME MACHINE AND GAME PROGRAM

TECHNICAL FIELD OF THE INVENTION

The present invention relates to a game machine that provides a clear display of symbols in multiple winning arrangements or win lines related to the symbols.

BACKGROUND OF THE INVENTION

Conventional game machines that display various symbols including wild symbols in the display area are well known. When pre-determined combinations of the symbols are arranged in such a way that a win is established, these game machines visually display the symbols or the win lines related to such symbols. Since the wild symbols play a special role of substituting for the other kind of symbols, it is easy for players to understand the win by clearly displaying that the pre-determined arrangement including the wild symbols is established.

However, when the pre-determined arrangement of symbols including at least one wild symbol establishes multiple wins, the player may be confused and may not understand by which arrangement of symbols he has won. Therefore it is desirable to display the winning arrangement including the wild symbol so that the players can easily understand.

On the other hand, the player's anticipation for a change of the game points tends to be greater when multiple wins are established by the pre-determined combinations of the symbols including the wild symbol than when only one winning is established. Conventionally, the wild symbols only have the one role of substituting for the other symbols. However, it is possible to provide a more attractive game by adding a new function to the wild symbols.

The present invention considers these backgrounds and provides a game machine that is capable of arousing the interest and the anticipation of the players by displaying the arrangement of symbols that relates to winning in a way that is easy to understand, when the win is established by including the wild symbols in the arrangement of the symbols.

SUMMARY OF THE INVENTION

To achieve the above mentioned objectives, a game machine according to the present invention includes: a display module that is capable of displaying a changing display at a start of a game, wherein multiple static symbols displayed in multiple areas are changing constantly to various symbols including a wild symbol, and that is also capable of displaying a static display wherein the symbols in the changing display become static again in the multiple areas; an evaluation module that can recognize arrangements of the static symbols; and a display mechanism that visually displays either arrangements of symbols by which multiple wins are established and/or win lines that are related to such arrangements of symbols, when the evaluation module recognizes and determines that a pre-determined combinations of symbols, in which at least one wild symbol is included, is arranged in such a way that multiple wins are established.

Thus, the game machine of the present invention displays visually the pre-determined combinations of symbols or the win line related to the arrangement of symbols when combinations of symbols, in which at least one wild symbol is included, are arranged in the predetermined way so that multiple wins are established. By these displays the player can easily recognize not only the winning but also the combinations and the arrangements of the symbols by which the wins are established. As a result the player's interests in the game are aroused.

According to another aspect, the present invention provides a game machine comprising: a display module that is capable of displaying a changing display at a start of a game, wherein multiple static symbols displayed in multiple areas are changing constantly to various symbols including a wild symbol, and that is also capable of displaying a static display wherein the symbols in the changing display become static again in the multiple areas; a static symbol determining module that determines each symbol to be in static display in the display areas; an evaluation module that can recognizing arrangements of the static symbols determined by the static symbol determination module; and a display mechanism that visually displays either arrangements of symbols by which multiple wins are established and/or win lines that are related to such arrangements of symbols, when the evaluation module recognizes and determines that pre-determined combinations of symbols, in which at least one wild symbol is included, are arranged in such a way that multiple wins are established.

Regardless of whether the symbols are really displayed statically or not, when the static evaluation module recognizes the multiple winning arrangements of symbols, one of which is the wild symbol, the symbols in the pre-determined arrangement and the win line which is related to these symbols are displayed visually. By these displays, the player can recognize easily which combinations and arrangements of symbols made him win. As a result the player's interests in the game are aroused.

According to another aspect, the present invention provides a game machine in which the display mechanism sequentially displays either the symbols in the multiple winning arrangements and/or the win lines related to the symbols in the multiple winning arrangements according to each individual winning pattern established by the arrangements of the symbols.

Thus, the win lines are sequentially displayed according to each individual winning pattern established by the arrangements of symbols. In other words, the win lines are displayed one by one with time intervals. This procedure allows the player to grasp the established win line more easily than all the win lines are displayed at one time. As a result of the player's interests in the game are aroused.

According to another aspect, the present invention provides a game machine in which the display mechanism vibrates in the display module the symbols that are arranged to establish multiple wins which share at least one common wild symbol.

When the pre-determined combinations of symbols are arranged in such a way that multiple wins are established, the symbols that constitute the winning arrangements vibrate. Because of the vibration of the symbols the players can recognize easily which win line and arrangement of symbols made him win, i.e., the player can easily recognize if there was a win or not. As a result, the player's interest in the game is aroused.

According to another aspect, the present invention provides a game machine in which the display mechanism uses a time interval to change the common wild symbol shared in the winning arrangements to other types of symbols that established the winning arrangement.

Since the wild symbol included in the winning arrangement is changed into other kind of symbols in the winning arrangement within a certain interval time, the player can recognize easily as soon as the winning is established the combination of symbols by which he wins. As a result the player's interests in the game are aroused.

According to another aspect, the present invention provides a game machine in which the display mechanism displays the wild symbol in one display area in a static display, while the symbols in any other display area are in changing display. When the evaluation module determines that the pre-determined combinations of symbols are arranged in multiple winning arrangements, the wild symbol is vibrated.

While the symbols in any of the display area are in the changing display, the wild symbol becomes static in other display area and the evaluation module determines that the pre-determined combinations of symbols are arranged in such way that multiple wins are established by including the common wild symbol, and then the wild symbol is vibrated. By this vibration the player can recognize easily that the wild symbol is included in the winning combinations of symbols. Because the player can know that he won before all the reels stop, he is eager to know by which combination of symbols he won. As a result the anticipation of the player to the game result is aroused.

According to another aspect, the present invention provides a game machine that also includes a selection module that selects a multiplication factor for the game points that is pre-determined according to the winning arrangement of the symbols wherein the multiplication factor, together with the wild symbol, is displayed in each display area of the display module where the wild symbol is displayed.

Since the multiplication factor for the game points is selected according to the winning arrangements of symbols and displayed together with the wild symbol, the player becomes eager to know the winning game points. As a result the player's anticipation to the game result is aroused.

According to another aspect, the present invention provides a game program that reads a series of operations into a computer and performs conversion to commands to execute the operations, wherein the series includes the following operations: providing a display which consists of a changing display in which multiple static symbols displayed in multiple areas are changing constantly to various symbols including a wild symbol, and a static display in which the symbols in the changing display become static again in the multiple areas; determining the static symbols in each of the display areas; recognizing the arrangement of the selected symbols; and providing visual display of either arranged symbols and/or a win line associated with the multiple winning arrangement of symbols when the pre-determined combination of the symbols are arranged so that multiple wins are established by including at least one of the wild symbols.

Thus, the symbols of the pre-determined arrangement or the win line related to the symbols are visually displayed, when the arrangements of the symbols that are selected by the symbol selection module, regardless if the symbols are displayed statically or not, are the pre-determined combinations of symbols arranged in such a way that a multiple wins are established by including at least one wild symbol. By these displays the player can easily recognize that not only the winning but also the winning combinations and arrangements of the symbols. As a result the player's interest in the game is aroused.

LIST OF DESIGNATORS

1: game machine, 2: case, 3: front panel, 7: symbol display module, 30: CPU, 31: ROM, 32: RAM, 37: display module control circuit, 61: the upper frame of the first reel, 62: the upper frame of the second reel, 63: the middle frame of the third reel, 64: the middle frame of the first reel, 65: the lower frame of the second reel, 66: the upper frame of the fourth reel, 67: the middle frame of the fifth reel, 71: the first reel, 72: the second reel, 73: the third reel, 74: the fourth reel, 75: the fifth reel, 81: wild symbol, 82: wild symbol, 83: wild symbol, 84: wild symbol, 85: ant symbol, 86: mole symbol

DETAILED DESCRIPTION OF THE PREFERRED EMBODIMENTS

A game machine according to an embodiment of the present invention is explained below. The game machine, according to this embodiment of the present invention, visually displays the symbols or the win lines related to the symbols when it is determined that the pre-determined combinations of symbols are arranged in multiple winning arrangements by including at least one wild symbol. The wild symbol is a symbol that can substitute for multiple types of specific symbols. Even if one of the symbols in a pre-determined winning combination is substituted by a wild symbol, the combination is still a winning one. A win line is defined as a line on which a win is established when a pre-determined combination of symbols are arranged. The multiple winning arrangements with multiple wins due to a shared wild symbol are defined as overlapping win lines or arrangements in which pre-determined combinations of the symbols form winning arrangements and the wild symbol is displayed statically in the display area where multiple win lines cross or where multiple numbers of winning arrangements overlap. When the symbols are arranged in these winning combinations, the static wild symbol in the crossed or overlapped display areas constitute not only a part of one winning arrangement but also constitute a part of another winning arrangement.

Figure 5:
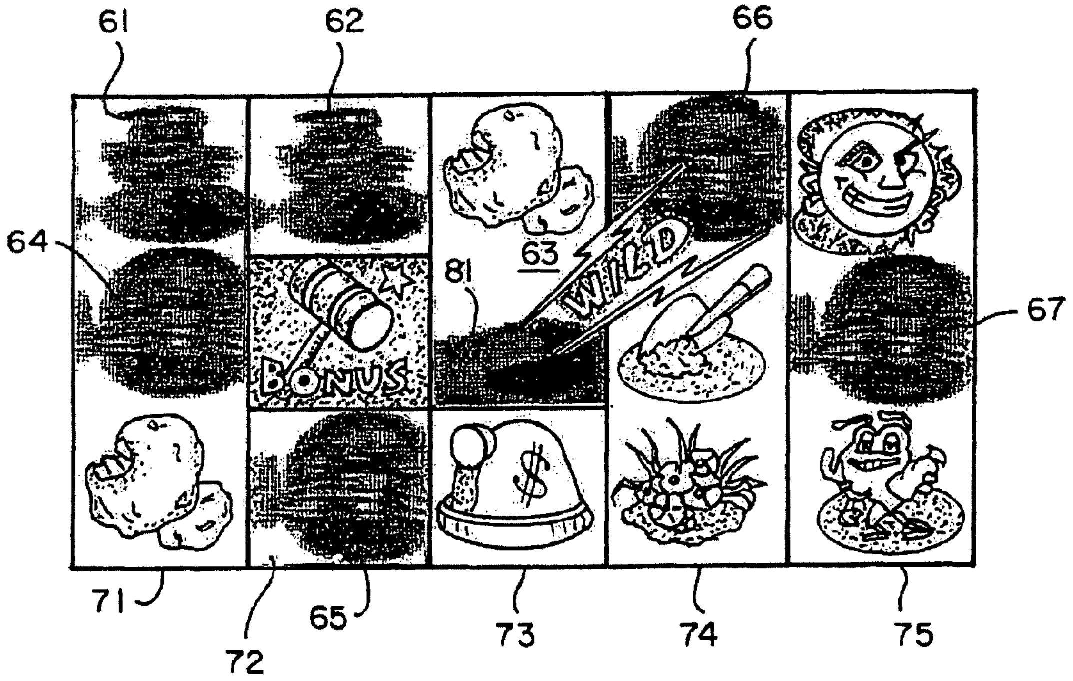
FIG. 5 is an example of a display in the symbol display module.
Figure 6:
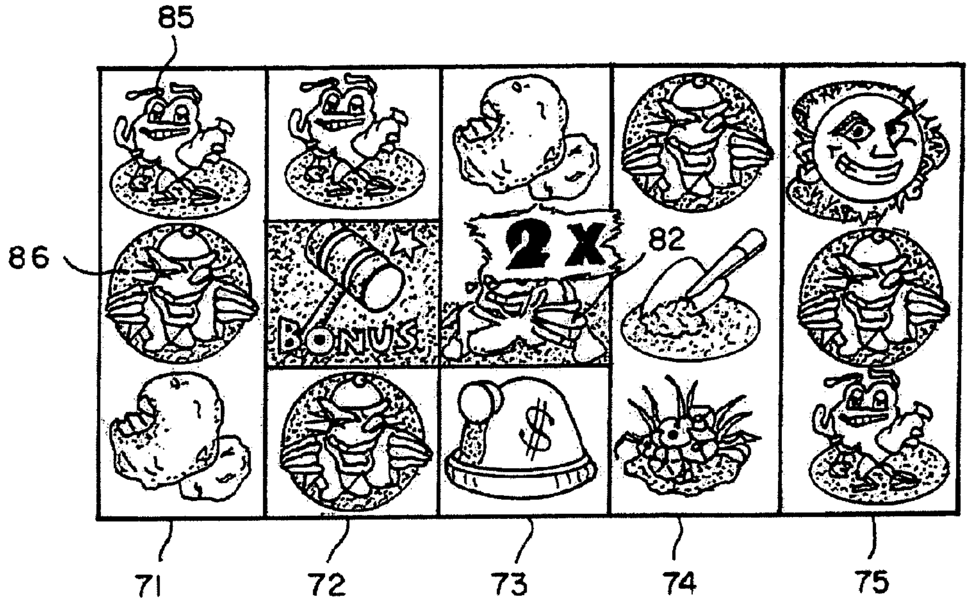
FIG. 6 is an example of a display in the symbol display module.

In the embodiment of the present invention, as shown in FIG. 6, the winning arrangements are set as an upper frame 61 of the first reel 71, an upper frame 62 of the second reel 72, and a middle frame 63 of the third reel 73 in one arrangement; and a middle frame 64 of the first reel 71, a lower frame 65 of a second reel 72, a middle frame 63 of a third reel 73, an upper frame 66 of a fourth reel 74, and a middle frame 67 of a fifth reel 75 in another arrangement. Further, as shown in FIG. 5 through FIG. 8, at the middle frame 63 of the third reel 73, symbols 81, 82, 83 and 84 that are continuously changing are defined as wild symbols. As shown in FIG. 6, the wild symbol has a function of changing and displaying the multiplication factor for the game point.

Thus, the present invention can be applied to game machines with mechanical reels or video reels by displaying the multiple symbols including wild symbols in a changing manner and by displaying the symbols in a static display based on the result of the internal random selection.

The present invention can be applied to all devices (e.g. game machines) that can display symbols. In the example in this description, the present invention is applied to a game machine that can provide a changing display of a row (or, alternatively, a column) of multiple types of symbols, and based on internal selections, provides the static display of symbols that were being changingly displayed. The section that changingly displays the symbols can include mechanical reels or video reels that provide a changing display of symbols as images in a liquid crystal screen or the like. The present invention can be implemented for game machines that, as in slot machines, determine stopping timing and a stopping sequence for the reel by having a player actively operate a stop button, as well as for game machines that, as in pachinko game machines, sequentially stop the reels automatically regardless of the player's intent. Also, in this embodiment of the present invention, coins will be used as the example for the game prize, but the present invention is not restricted to this type of game prize, and any other medium that can provide game points such as pachinko balls can be used.

Figure 1:
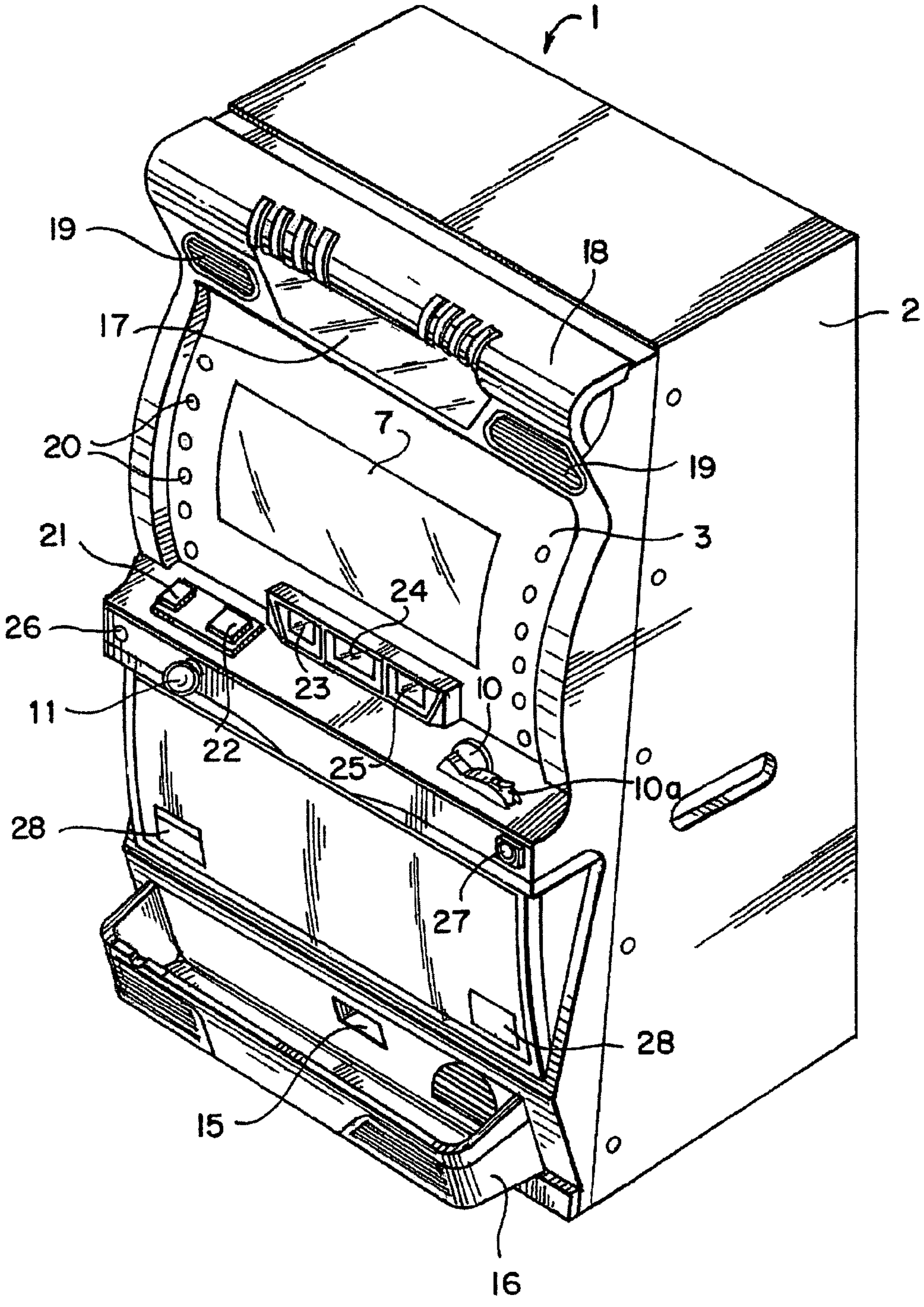
FIG. 1 is a perspective drawing showing the exterior of the game machine related to an embodiment of the present invention.

In FIG. 1, a game machine 1 is formed from a case 2 and a front panel 3 attached to the front surface of the case 2 so that it can be opened and closed. A liquid crystal panel or a CRT (Cathode-Ray Tube) is disposed behind the front panel 3, and a symbol display module 7 displaying symbols, e.g., in five columns, is provided. This embodiment of the present invention uses video reels. A program is executed to display five reels on the symbol display module 7.

Figure 4:
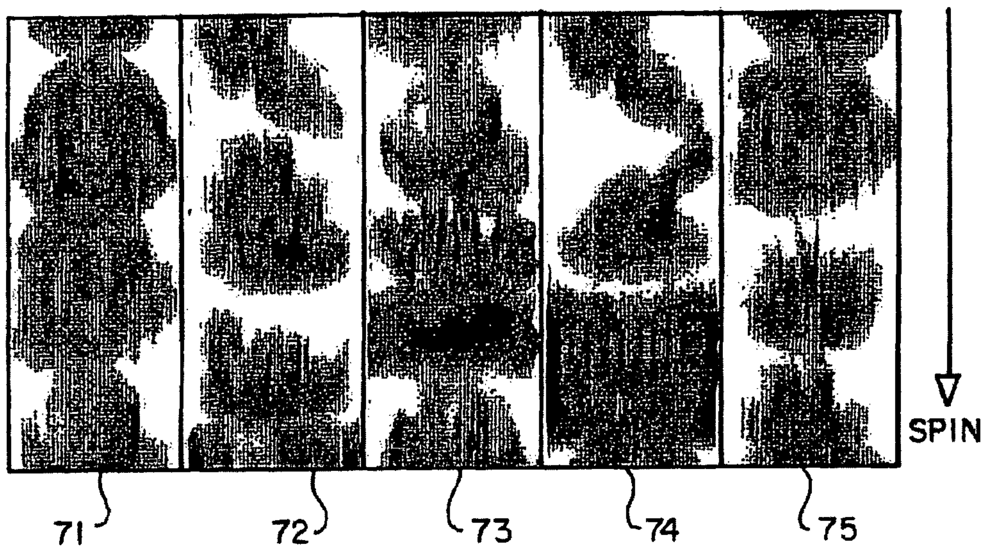
FIG. 4 is an example of a display in the symbol display module.

As shown in FIG. 4, the symbol display module 7 includes five reels that can display symbols in a changing or static manner along the column direction (vertically with respect to the game machine). More specifically, there are: a first reel 71, a second reel 72, a third reel 73, a fourth reel 74 and a fifth reel 75. The reels 71-75 can display the symbols in a changing or static manner.

The symbol display module 7 displays the wild symbol and other types of symbols and as described above, displays multiple types of symbols in a vertically changing manner. Based upon the result of the internal selection, symbols in the changing display are then stopped.

When it is determined that a pre-determined combination of symbols is displayed in multiple winning arrangements including at least one common wild symbol, the player may not realize by which combination of symbols he won. This embodiment of the present invention demonstrates the combinations of ant symbols 85 at the upper frame 61 of the first reel, the upper frame 62 of the second reel, and the middle frame 63 of the third reel; and mole symbols at the middle frame 64 of the first reel, the lower frame 65 of the second reel, the middle frame 63 of the third reel, the upper frame 66 of the fourth reel, and the middle frame 67 of the fifth reel. In this case, the wild symbol of the middle frame 63 of the third reel is used as the ant symbol 85 and also used as the mole symbol 86. When multiple wins are won by the arrangements sharing a wild symbol as shown above, the symbols in the winning arrangements are displayed in different and overlapping arrangements, and the wild symbol functions as multiple and different symbols. Therefore, it is difficult for the player to understand by which combination or arrangement of symbols he won. This embodiment of the present invention, as shown in FIG. 5, provides each symbol with a vibrating function when the winning arrangements are composed. By this vibration, the player can easily recognize the winning combinations and arrangements of the symbols. Thus, the interest of the players is attracted to this game and the anticipation for the change of the game points after the winning is aroused.

Also disposed on the front surface of the case 2 are a coin deposit opening 10 and a coin return button 10*a* that returns a coin in cases such as when a deposited coin is stuck. A start lever 11 is a lever used to start the rotating display (changing display) on the reel display module 7.

The game of the game machine 1 starts by having the player perform a bet operation to identify a valid win line. Different win line settings are possible, such as the horizontal center line, an upper or lower horizontal line, and a diagonal line. The bet operation is performed by depositing a coin in the coin deposit opening 10 described later or by performing a bet operation with a coin being stored using a stored coin deposit button 21. Bet operations can also be performed through a combination of these methods.

Further, not only may the win lines be pre-set at the start of a game as described above, but also a win may be determined by a pre-determined arrangement of the symbols. For example, a bonus game is won when three bonus symbols are displayed in any of the three regions in the symbol display module 7. Compared to when the win lines are preset, the degree of freedom in winning is higher and the anticipation of the players increases when the wins are determined based upon the pre-determined arrangement of symbols regardless of the win lines as described above.

Once the player has identified a win line through a bet operation and operated the start lever 11, the symbol display module 7 displays the symbols in a changing manner. When a predetermined duration has elapsed, the symbols being displayed in a changing manner are sequentially displayed in a static manner by the symbol display module 7. For example, the stopping sequence can, when facing the machine, go from left to right. When performing this stopping procedure, the stopping operations are separated by 0.5 second intervals. When the symbols are stopped and a predetermined symbol combination is displayed on one of the win lines, a win associated with the predetermined symbol combination is awarded.

A coin payout opening 15 and a coin holding tray 16 are disposed below the front panel 3. A game effects display 17 is disposed above the front panel 3 to provide game effects. The game effects display 17 can be, for example, an LCD (Liquid Crystal Display) or can be formed from various types of lamps. In the example presented in this embodiment, an LCD is used. A bonus game display 18 is also disposed above the front panel 3. The bonus game display 18 is formed from LEDs (Light Emitting Diodes) and provides displays for high-value bonuses awarded to the player, game effects, errors, and the like. Speakers 19 generate voice instructions, music, sound effects, and the like. If a bonus prize is won, the game becomes more advantageous for the player, e.g., the win rate can become 1/3.

Multiple lamps 20 disposed on the front panel 3 are turned on, turned off, or turned on and off, in order to indicate the number of deposited coins (or the number of credits that have been bet), the activated win line, or when there has been a win. The stored coin deposit button 21 is a button for using a predetermined number of coins stored (credited) in a coin storage device (not shown), and a stored coin deposit button

22 is a button for using the maximum allowed number of coins stored in the coin storage device (not shown). A coin storage count display module 23 displays the number of coins stored in the coin storage device (not shown). A win count display module 24 displays a win count or a remaining count or the like when a bonus is won. A coin payout count display module 25 displays a coin payout count and the like. The coin storage count display module 23, the win count display module 24, and the coin payout count display module 25 can be formed, for example, from LEDs. An accounts button 26 settles accounts with regard to the stored coins. A locking device 27 locks and unlocks the door depending on the direction in which the locking device 27 is turned. A label 28 indicates the type of the game machine 1, the name of the manufacturer, or the like.

Figure 2A:
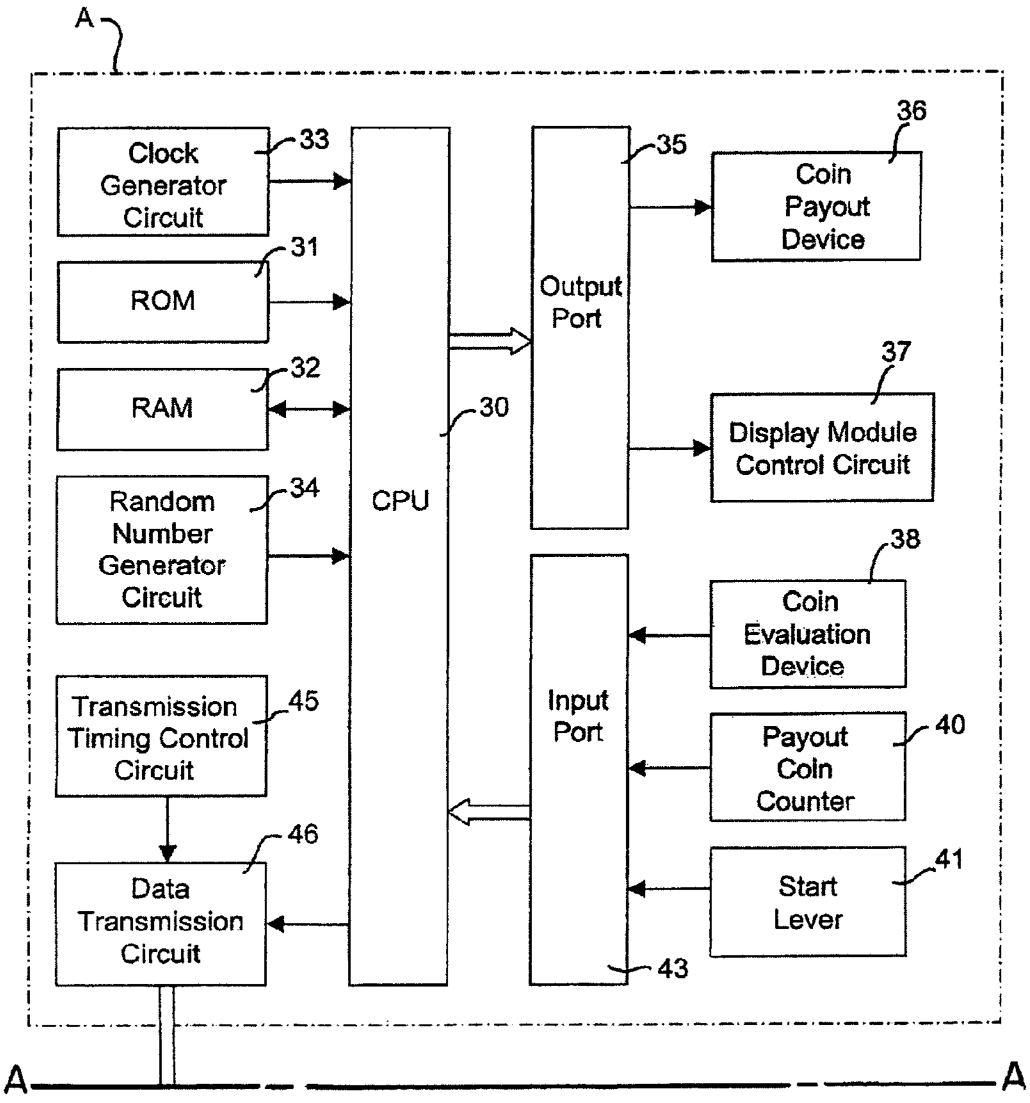
FIGS. 2A and 2B are block diagrams of the electric composition of the game machine related to an embodiment of the present invention.
Figure 2B:
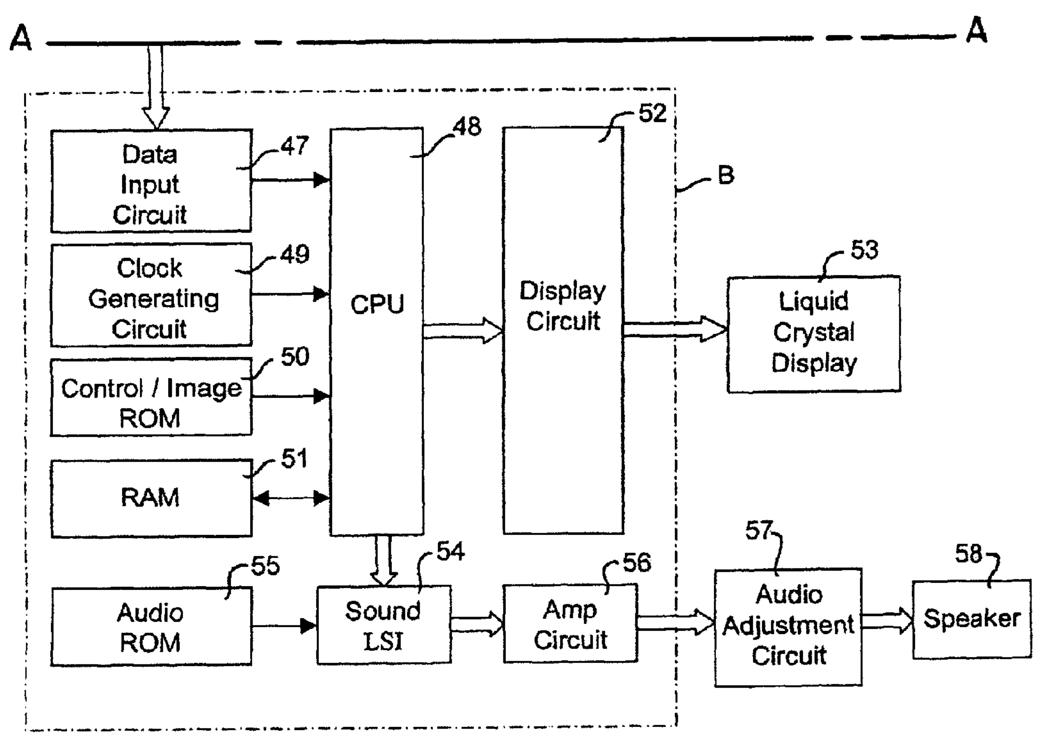

FIGS. 2A and 2B show the electronic architecture of the game machine according to this embodiment. The game machine 1 is formed, electronically, from a main substrate A and a sub-substrate B. The main substrate A is equipped with a CPU 30, a ROM 31, and a RAM 32 and performs control operations according to a program set up ahead of time. In addition to a control program for controlling the operations of the game machine 1, the ROM 31 stores win group selection tables and the like used to determine win groups ahead of time (an internal selection). The CPU 30, the ROM 31, and the RAM 32 form an evaluation module and a selection module.

Also, the CPU 30 is connected to a clock generator circuit 33 generating a reference clock pulse and a random number generator circuit 34 generating random numbers in a fixed manner. The CPU 30, ROM 31, RAM 32, and the random number generator circuit 34 form a static symbol selection module. A control signal from the CPU 30 is sent by way of an output port 35 to a coin payout device 36 that performs coin payout and to a display module control circuit 37 that controls the symbol display module 7. The symbol display module 7 and the display module control circuit 37 form a display module, and the CPU 30, the ROM 31, the RAM 32, the symbol display module 7, and the display module control circuit 37 form an indicating mechanism.

Also, the CPU 30 receives, by way of an input port 43, signals from a coin evaluation device 38, which determines whether a coin is valid or not, a payout coin counter 40, which counts the number of payout coins, and the start lever 41, which starts the rotation of the reel. Signals output from the CPU 30 are controlled by a transmission timing control circuit 45 controlling signal transmission timing to the sub-substrate B and are sent to the sub-substrate B by way of a data transmission circuit 46.

At the sub-substrate B, the signal sent from the data transmission circuit 46 is received by the data input circuit 47. The signal received by the data input circuit 47 is processed by a CPU 48. The CPU 48 is connected to a clock generator circuit 49 generating a reference clock pulse, a control/image ROM 50 in which various programs and image data are recorded, and a RAM 51. Data relating to images are sent from the CPU 48 to the liquid crystal display 53 by way of a display circuit 52, which performs image processing. A liquid crystal display 53 displays text, static images, and moving images. Also, data relating to audio is sent from the CPU 48 to an amp circuit 56 by way of a sound LSI (Large Scale Integrated Circuit) 54, which performs audio processing. The sound LSI 54 extracts necessary audio data from an audio ROM 55 and performs audio data processing. The audio data that has been amplified by the amp circuit 56 is sent to the speakers 58 by way of an audio adjustment circuit 57, which performs audio adjustments.

Figure 3:
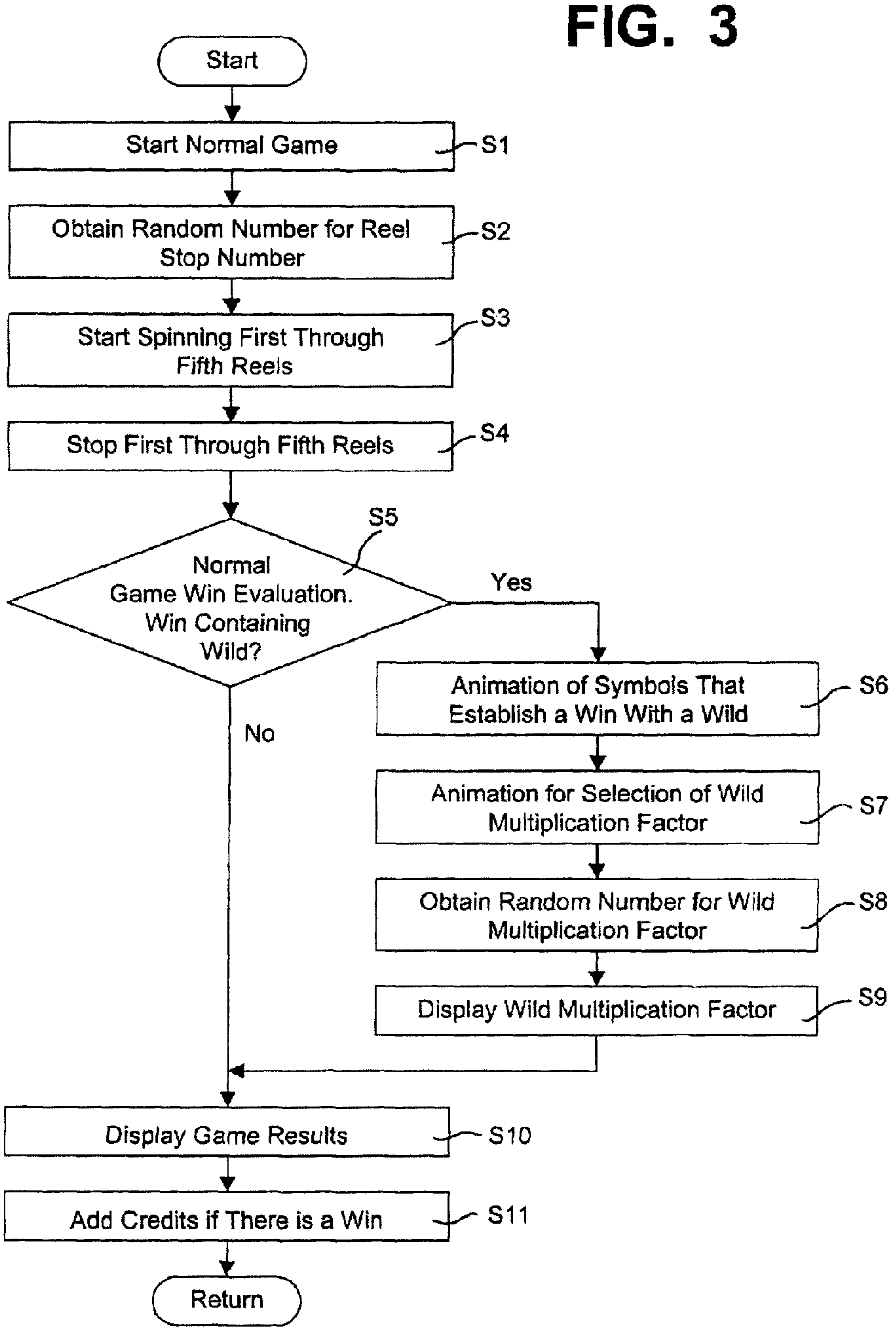
FIG. 3 is a flow chart of the operations of the game machine related to an embodiment of the present invention.

Next, the operations of a game machine according to this embodiment of the present invention will be described. FIG. 3 shows a flowchart illustrating the operations performed by the game machine 1. FIG. 4 through FIG. 8 are samples of displays in the symbol display module 7.

Ordinarily, a game starts by an input by a player (step S1). As mentioned above, a win line is determined by the bet operation of the player and the start lever 11 is handled.

A win may be determined by not only the win line set at the start of the game but also by a pre-determined arrangement of symbols. When a win is determined by a pre-determined arrangement of symbols, the anticipation of the players is aroused because of the uncertainty of the winning arrangement compared to when the win line is pre-determined.

Next, random numbers are obtained for stopping numbers of the reels from the first to the fifth reel (step S2), and then the reels from the first to the fifth begin spinning (step S3). The display module displays, as shown in FIG. 4, the symbols spinning and changing in each of the reel display areas. The direction of spinning may be downwards or upwards. The reels may be set not only in rows but also in columns, and the direction of spinning may be from the left to the right or from the right to the left.

Next, the spinning of the first to fifth reels is stopped sequentially (step S4). In this example, reels are stopped sequentially with pre-determined time intervals from the first reel to the fifth reel. The time interval may be, for example, 0.5 seconds. In this embodiment, as shown in FIG. 5, the wild symbol is displayed statically in the middle frame 63 of the third reel, the ant symbols 85 are displayed statically in the upper frame 61 of the first reel and the upper frame 62 of the second reel, and the mole symbols 86 are displayed statically in the middle frame 64 of the first reel, the lower frame 65 of the second reel, the upper frame 66 of the fourth reel and the middle frame 67 of the fifth reel. Next, an evaluation is performed to see if there is a normal game win, and an evaluation is performed to see if there is a win based on multiple combinations involving a shared wild symbol (step S5).

As the result of these evaluations, as shown in FIG. 5, it is found that wins are established in the win line formed by the upper frame 61 of the first reel, the upper frame 62 of the second reel, and the middle frame 63 of the third reel, as well as by the win line formed by the middle frame 64 of the first reel, the lower frame 65 of the second reel, the middle frame 63 of the third reel, the upper frame 66 of the fourth reel, and the middle frame 67 of the fifth reel. When wins are established by multiple combinations of the symbols including the wild symbol, the wild symbol and the symbols involved in the wins or the win lines related to the wins are displayed visually by animation (step S6). For example, as shown in FIG. 5, the symbols in the win arrangements are vibrated. Further, as to the wild symbol 81, a display depicting a voice shouting "wild" from a hole is shown. At this time, voice data for shouting "wild" may actually be output through a speaker. As a result, the player can easily recognize that the pre-determined combinations of the symbols including a common wild symbol are arranged in multiple winning arrangements, that the specific wild symbol is shared by the multiple winning arrangements, and that the wins are established by the specific arrangements composed of the combination of the specific symbols, thus attracting the player's interest to this game.

As described above, the symbols in the winning arrangements that include the wild symbol or the win line related to such symbols are vibrated by animation but another method may be employed to display these symbols visually. For example, the shape, the pattern, the color of the symbols or the linkage among the symbols may be changed. By these changes in display the player can recognize the common wild symbol, the symbols involved in the winning arrangements, and the arrangements of the symbols.

Next, the game point multiplication factor selection based on the wild symbol is displayed by animation (step S7) and a random number for a multiplication factor for the game points is obtained (step S8). As shown in the middle frame 63 of the third reel in FIG. 6, the multiplication factor for the game points is determined and displayed in a multiplication factor animation in the wild symbol (step S9). In this embodiment, as shown in the symbol 82 in FIG. 6, a mole with different features from other moles (for example, a mole looking like a middle aged woman) is animated to show its face from the hole in the wild symbol shown in FIG. 5, with a card displaying the multiplication factor that suggests the game points are changed. This continuous-time animation depicts a mole jumping out of the hole of the wild symbol.

In FIG. 6, the multiplication factor for the game points is determined to be 2 but this factor can be changed to 3, 4, or higher according to the random numbers obtained for the multiplication factor for the game points. The player's anticipation for the multiplication factor is increased through this process. When the multiplication factor is determined, the pre-determined game points are multiplied by the multiplication factor and paid out with coins.

In the above mentioned explanation, the wild symbol 82 was depicted as a mole looking like a middle aged woman in animation. However, the wild symbol 82 may be depicted as other figures and does not need to be in animation. Therefore, the present invention can be applied to game machines not only with video reels but also with mechanical reels.

Further, the display of the multiplication factor for the game points is not restricted to the display area of the wild symbol but may be carried out in other areas. For example, to emphasize the multiplication factor for the game points, the display can be expanded beyond the boundaries of the display area of the reel for the wild symbol. By this display, the player can recognize more easily the change in the multiplication factor for the game points, thus the interest in the game is aroused.

Figure 7:
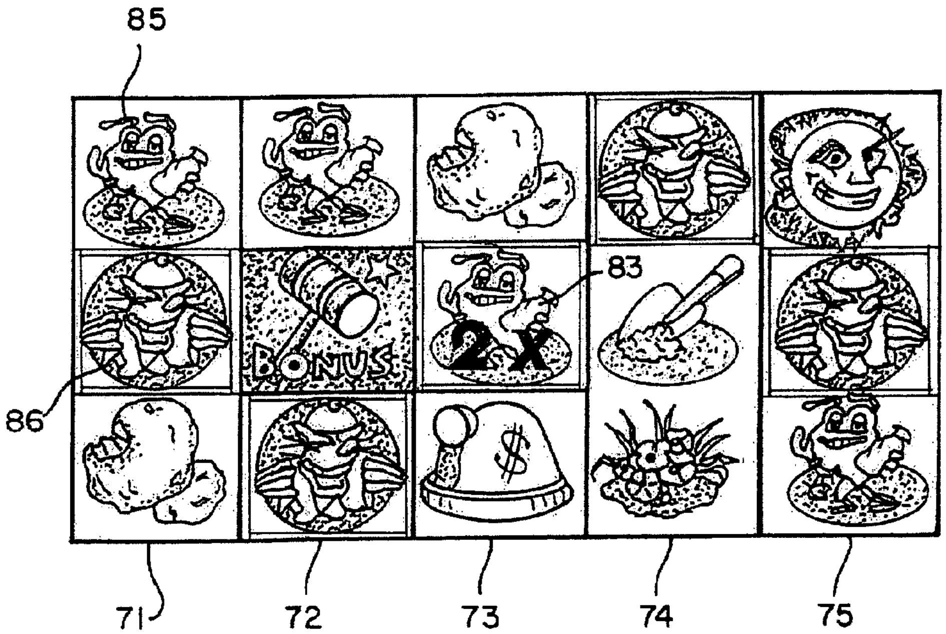
FIG. 7 is an example of a display in the symbol display module.
Figure 8:
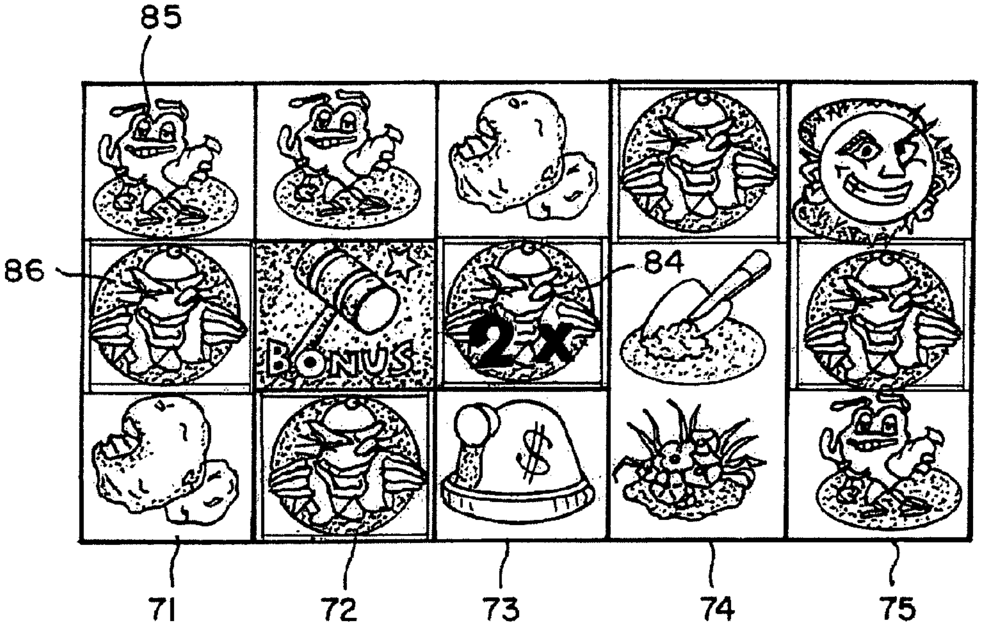
FIG. 8 is an example of a display in the symbol display module.

Still further, the display is changed to make the winning combination of the symbols more easily understandable. That is, as shown in FIG. 7 and FIG. 8, the wild symbol is changed to the ant symbol 83 and the mole symbol 84 in an alternating manner to demonstrate that the wins are established by the ant symbols and the mole symbols. At the same time the multiplication factor for the game points is displayed to visually show the change in the multiplication factor for the game points. By this display, the player can recognize more easily the multiple numbers of the winning combinations of the symbols. As a result, the player's interest in the game is aroused.

On the other hand, when multiple winning combinations that include the wild symbol are not found at step S5, procedures in step S10 are carried out.

The result of the game is displayed (step S10) and if there are wins, the remaining coin count (credit) is added (step S11), and the game returns to the game start stand-by state.

The present invention can be applied to not only game machines with reels, as described above, but also to game machines playing games such as poker and black jack while displaying the cards. The present invention can also be applied to game machines playing bingo games.

In the explanation described above, the evaluation module recognizes the arrangement of each symbol after the symbols are statically displayed. However, the evaluation module can determine each symbol for the static display in each display area independently, either before or after the changing or static display of the symbols and then can recognize the arrangement of the symbols and determine whether there is a win.

By this process, the present invention can be applied to game machines that determine the wins from the arrangement of symbols before they are in the static display, and in such game machines, the player can easily recognize the establishment of multiple wins involving a common wild symbol.

Further, in game machines in which the arrangements of the symbols are determined independently of the static display of the symbols, the common wild symbol can be vibrated and the player can be notified of the wins beforehand, while the wild symbol is statically displayed and other symbols are still in the changing display, when the evaluation module determines that the wins are established by multiple combinations of the symbols including the common wild symbol. For example, assuming that all the reels start spinning and each reel is to stop sequentially with a pre-determined timing, and further assuming that only the first reel 71 stops spinning while the other reels are still spinning, the wild symbol is statically displayed in the display area of the first reel 71, and when the wild symbol is commonly included in the multiple winning arrangements, the wild symbol in the first reel 71 is vibrated.

Thus, when the first reel 71 containing the wild symbol is in static display while other reels are in changing display, and the wild symbol is determined to be involved in the multiple numbers of wins and the wild symbol is vibrated, thereby increasing the player's anticipation for the wins.

Further, symbols in multiple win arrangements or win lines associated with symbols arranged so that multiple wins are established may be displayed with individual win arrangements being displayed sequentially.

Thus, the win lines are displayed sequentially according to the established individual arrangements. That is, each win line is displayed visually with a time delay and this allows the player to grasp more easily which win line is established compared to when all the win lines are displayed simultaneously. As a result the player's interest in the game is aroused.

The characteristic operations of the present invention as described above are carried out by executing a control program by a computer. The control program reads a series of operations into a computer at the start of a game and turns them into executable commands wherein the series comprises the following operations: executing a changing display in which multiple static symbols displayed in multiple areas are changing constantly to various symbols including a wild symbol, and a static display in which the symbols in the changing display become static again in the multiple areas; determining a static symbol in each display area; recognizing the arrangement of the determined symbols; and executing a visual display of arranged symbols and the win lines that are related to multiple winning arrangements of symbols when the pre-determined combinations of the symbols are arranged in such a way that multiple wins are established by including at least one wild symbol.

Thus, the symbols of the pre-determined arrangement or the win line related to these symbols are displayed visually, when the arrangements of the symbols that are determined by the static symbol determining module, regardless of whether the symbols are displayed statically or not, form a pre-determined combination of symbols arranged in such a way that multiple wins are established by including at least one wild symbol. By these displays, the player can easily recognize not only when there is a win but also the winning combination and arrangement of the symbols that established the win. As a result, the interest of the player in the game is aroused.

The above mentioned program can be obtained in a recorded state in memory media such as CD-ROM, DVD, or the like. These programs can be obtained also by receiving the signals from a computer that is a data transmitting device through communication networks such as public telephone lines, private telephone lines, cable television lines, and wireless communication lines. These signals are the computer data signals embodied in a pre-determined carrier wave containing the program. When transmitting the program, only a part of the program needs to be transmitted via the media. That is, it is not necessary that all the data constituting the program be in the media at one time. Further, the methods for transmitting the program from the computer include cases where the data constituting the program are transmitted either continuously or discontinuously.

Possible methods for visually indicating the symbols associated with wins include: (1) displaying the symbols sharing the wild symbol in animation; (2) using no animation for symbols that share wild symbols but the symbols that do not share a wild symbol are made less conspicuous (for example by shutting off or reducing the back light); and (3) using no animation for the symbols sharing a wild symbol but using animation to make these symbols more conspicuous (for example by surrounding these symbols with bright star designs in animation). Further, other animations and changes in symbol design, such as a fade in, fade out, enlargement, size reduction, rotation, and the like of the symbols may be carried out.

Still further, possible methods for demonstrating the win lines visually include: (1) displaying the line tags of the win lines in animation; (2) changing the color of the line tags of the win lines; (3) displaying words such as "With Wild" on the line tags of the win lines.

Advantages of the Present Invention

As explained above, the game machine in the present invention includes: a display module that is capable of displaying a changing display with the start of a game, wherein multiple numbers of static symbols displayed in multiple areas are changing constantly to various symbols including a wild symbol, and that is also capable of displaying a static display wherein the symbols in the changing display become static again in the multiple areas; an evaluation module that can recognize the arrangements of the static symbols; and a display mechanism that displays visually the arrangement of symbols by which multiple wins are established, and a win line which is related to such an arrangement of symbols, when the evaluation module recognizes the pre-determined arrangement of symbols, in which at least one wild symbol is included, and determines that multiple wins are established.

Thus, the game machine in the present invention provides a visual display of the symbols of the pre-determined arrangement or the win lines related to these symbols, when the arrangement of the symbols is a pre-determined combination of symbols arranged in such a way that multiple wins are established by including at least one wild symbol. By these displays, the player can easily recognize that only the win but also the winning combination and arrangement of the symbols. As a result, the interest of the player in the game is aroused.

We claim:

1. A game machine comprising:

a display module having multiple display areas, each capable of displaying various symbols including a wild symbol, in a static display both in initial imagery at the start of a game and in final imagery at the end of said game, during the game the display module being capable of displaying changing symbols in each of said display areas;

an evaluation module that can recognize arrangements of said symbols in said static display including at least one of:

multiple win arrangements of symbols including said wild symbol, by which multiple wins are established;

multiple win lines related to said multiple win arrangements of said symbols including said wild symbol, by which said multiple wins are established, and normal win arrangements based on a pre-determined combination of symbols not containing a wild symbol that is shared among multiple win arrangements;

wherein said evaluation module recognizes and determines if a win arrangement is at least one normal win, and/or multiple wins based on a pre-determined combination of said symbols, in which at least one said wild symbol is included, arranged in such a way that said multiple wins are established by the shared inclusion of the at least one said wild symbol in at least two win arrangements of symbols and wherein if said multiple wins that include said shared wild symbol are recognized, said display module distinguishably displays such multiple wins that include said shared wild symbol such that one can easily recognize said multiple wins that include the at least one said wild symbol.

2. A game machine according to claim 1, further including:

a symbol determining module that determines each said symbol in said initial and final imagery in said multiple display areas of said display module; and a display mechanism that vibrates different symbols, portions of symbols, groups of symbols, or any combination thereof of said final imagery while said final imagery is displayed.

3. The game machine as described in claim 2, wherein:

said display module displays said at least one wild symbol in one of said display areas of said display module in a static display, while said symbols in other said display areas of said display module are displayed in a changing display; and said at least one wild symbol is vibrated when said evaluation module determines that said final combination of symbols are arranged in said multiple win arrangements.

4. The game machine as described in claim 2, wherein said display mechanism sequentially visually differentiates at least one of:

said multiple win arrangements of said symbols by which said multiple wins are established; and said multiple win lines related to said multiple win arrangements of said symbols by which said multiple wins are established, according to each individual winning pattern established by said multiple win arrangements of said symbols by which said multiple wins are established.

5. The game machine as described in claim 2, wherein said display mechanism visually differentiates by vibrating in said display module said symbols that are arranged to establish said multiple wins which share in common at least one of said at least one wild symbol.

6. The game machine as described in claim 2, further comprising a selection module that selects a multiplication factor for game points that is pre-determined according to said multiple win arrangement of said symbols, wherein said multiplication factor, together with said wild symbol, is displayed in each of said display areas of said display module where said at least one wild symbol is displayed.

7. The game machine as described in claim 2, wherein the display module is operable to display the final imagery by vibrating different symbols, portions of symbols, groups of symbols, or any combination thereof of said final imagery while said final imagery is displayed and while said at least one wild symbol is alternately changed to said other types of symbols.

8. The game machine as described in claim 1, wherein said display module sequentially visually differentiates at least one of:

said multiple win arrangements of said symbols by which said multiple wins are established; and said multiple win lines related to said multiple win arrangements of said symbols by which said multiple wins are established, according to each individual winning pattern established by said multiple win arrangements of said symbols by which said multiple wins are established.

9. The game machine as described in claim 8, wherein said display module visually differentiates by vibrating in said display module said symbols that are arranged to establish said multiple wins which share in common at least one of said at least one wild symbol.

10. The game machine as described in claim 8, further comprising a selection module that selects a multiplication factor for game points that is pre-determined according to said winning arrangement of said symbols, wherein said multiplication factor is displayed in each of said display areas of said display module where said at least one wild symbol is displayed.

11. The game machine as described in claim 1, wherein said display module distinguishably displays by vibrating in said display module said symbols that are arranged to establish said multiple wins which share in common at least one of said at least one wild symbol.

12. The game machine as described in claim 11, further comprising a selection module that selects a multiplication factor for game points that is pre-determined according to said multiple win arrangement of said symbols, wherein said multiplication factor is displayed in each of said display areas of said display module where said at least one wild symbol is displayed.

13. The game machine as described in claim 1, further comprising a selection module that selects a multiplication factor for game points that is pre-determined according to said multiple win arrangements of said symbols, wherein said multiplication factor is displayed in each of said display areas of said display module where said at least one wild symbol is displayed.

14. The game machine as described in claim 1, wherein the display module is operable to display the final imagery by vibrating different symbols, portions of symbols, groups of symbols, or any combination thereof of said final imagery while said final imagery is displayed and while said at least one wild symbol is alternately changed to said other types of symbols.

15. The game machine as described in claim 1, further comprising;

an audio module where voice data is stored, and a speaker device through which a voice is output when said wild symbol is displayed in the display module.

16. The game machine as described in claim 1, wherein said display mechanism uses a time interval to alternately change said wild symbol shared in said multiple wins to distinguish from other types of said symbols that established said multiple wins.

17. A method for providing a game program, said method comprising the steps of:

providing a display having multiple display areas and being capable of displaying various symbols including a wild symbol, in a static display both in initial imagery at the start of a game and final imagery at the end of said game, and during the game displaying changing symbols in each of said display areas;

determining said symbols in said final imagery in each of said display areas of said display;

recognizing an arrangement of said symbols in said final imagery;

evaluating and determining if a win arrangement is at least one normal win based on a pre-determined combination of said symbols not containing a wild symbol that is shared among multiple win arrangements, and/or multiple wins based on a pre-determined combination of said symbols in which at least one said wild symbol is included, arranged in such a way that said multiple wins are established by the shared inclusion of the at least one said wild symbol in at least two win arrangements of symbols; and distinguishably displaying at least one of the followings such that one can easily recognize multiple wins that include at least one wild symbol:

said arrangement of said symbols including said at least one wild symbol, by which multiple wins are established in said static display, and a win line associated with said arrangement of said symbols including said at least one wild symbol, by which said multiple wins are established.

18. The method as described in claim 17, wherein at least one of said arrangement of said symbols by which said multiple wins are established and said win line associated with said arrangement of said symbols by which said multiple wins are established are sequentially visual differentiated according to each individual winning pattern established by said arrangement of said symbols by which said multiple wins are established.

19. The method as described in claim 17, wherein said step of providing a visual display comprises the step of vibrating said symbols that are arranged to establish said multiple wins which share in common at least one of said at least one wild symbol.

20. The method as described in claim 17, wherein:

said at least one wild symbol in one of said display areas in said initial imagery display is static, while said symbols in other said display areas of said display are changing; and said at least one wild symbol is vibrated when said pre-determined combination of said symbols is arranged so that said multiple wins are established.

21. The method as described in claim 17, further comprising the step of selecting a multiplication factor for game points that is pre-determined according to said arrangement of said symbols, wherein said multiplication factor is displayed in each of said display areas of said display where said at least one wild symbol is displayed.

22. The method as described in claim 17, further comprising the step of vibrating different symbols, portions of symbols, groups of symbols, or any combination thereof of said final imagery while said final imagery is displayed and while said at least one wild symbol is alternately changed to said other types of symbols.

23. The method as described in claim 17, wherein a voice is output from a speaker when said wild symbol is displayed in the display module.

24. The method as described in claim 17, wherein said display mechanism uses a time interval to alternately change said wild symbol shared in said multiple wins to distinguish from other types of said symbols that established said multiple wins.

25. A method of providing a game, said method comprising the steps of:

providing a display capable of displaying initial imagery at the start of a game comprising a grouping of symbols and at least one wild symbol, final imagery at the end of said game comprising a final combination of symbols comprising a fixed grouping of symbols and at least one wild symbol, and during the game displaying changing symbols;

recognizing and determining if a win arrangement is at least one normal win based on a pre-determined combination of said symbols not containing a wild symbol that is shared anions multiple win arrangements, and/or multiple wins based on a pre-determined combination of said symbols, in which at least one said wild symbol is included, arranged in such a way that said multiple wins are established by the shared inclusion of the at least one said wild symbol in at least two win arrangements of symbols; and distinguishably displaying a win line associated with said arrangement of said symbols including said at least one optional wild symbol, by which said multiple wins are established, such that one can easily recognize multiple wins that include at least one wild symbol.

26. The method as described in claim 25, further comprising the step of vibrating different symbols, portions of symbols, groups of symbols, or any combination thereof of said final imagery while said final imagery is displayed and while said at least one optional wild symbol is alternately changed to said other types of symbols.

27. The method as described in claim 25, wherein a voice is output from a speaker when said wild symbol is displayed in the display module.

28. The method as described in claim 25, wherein said display mechanism uses a time interval to alternately change said wild symbol shared in said multiple wins to distinguish from other types of said symbols that established said multiple wins.

29. A game machine comprising:

a display module that is capable of displaying initial imagery displayed at the start of a game including at least one wild symbol, and final imagery at the end of said game comprising a final combination of symbols comprising a fixed grouping of symbols including at least one wild symbol, and during the game the display module being capable of displaying changing symbols;

an evaluation module that can recognize arrangements of the symbols in the final imagery and can determine if a win arrangement is at least one normal win based on a pre-determined combination of said symbols not containing a wild symbol that is shared among multiple win arrangements, and/or multiple wins based on a pre-determined combination of said symbols, in which at least one said wild symbol is included, arranged in such a way that said multiple wins are established by the shared inclusion of the at least one said wild symbol in at least two win arrangements of symbols; and a selection module that selects a multiplication factor for game points, the selected multiplication factor being pre-determined according to said multiple winning arrangements of said symbols;

wherein the display module visually alters the final imagery displayed by the display module to indicate the symbols that establish multiple winning arrangements when at least two of the multiple winning arrangements of symbols are established by the shared inclusion in common of the at least one wild symbol, thereby distinguishably displaying at least one of the followings such that one can easily recognize multiple wins that include at least one wild symbol:

said multiple winning arrangements of symbols including said at least one wild symbol, and multiple win lines related to said multiple winning arrangements of symbols including said at least one wild symbol.

30. The game machine as described in claim 29, wherein the display module is operable to display the final imagery by vibrating different symbols, portions of symbols, groups of symbols, or any combination thereof of said final imagery while said final imagery is displayed and while said at least one wild symbol is alternately changed to said other types of symbols.

31. The game machine as described in claim 29, further comprising;

an audio module where voice data is stored, and a speaker device through which a voice is output when said wild symbol is displayed in the display module.

32. The game machine as described in claim 29, wherein the display module, during a time interval, alternately changes said at least one wild symbol shared in common in the winning arrangements to distinguish from display of the other types of symbols that established the winning arrangements, and to display said multiplication factor in combination with said at least one wild symbol and in combination with said alternately-displayed other types of symbols.

* * * * *